(12) United States Patent
Reilly et al.

(10) Patent No.: US 11,363,098 B2
(45) Date of Patent: Jun. 14, 2022

(54) PEER-TO-PEER CONNECTIONS BASED ON USER-DEFINED PROBABILITY ASSERTIONS

(71) Applicant: Fractal Technologies, Inc., Farmingdale, NY (US)

(72) Inventors: Thomas Reilly, Farmingdale, NY (US); Joseph Abergel, Plainview, NY (US)

(73) Assignees: Thomas Reilly, Farmingdale, NY (US); Joseph Abergel, Plainview, NY (US)

( * ) Notice: Subject to any disclaimer, the term of this patent is extended or adjusted under 35 U.S.C. 154(b) by 0 days.

(21) Appl. No.: 16/736,738

(22) Filed: Jan. 7, 2020

(65) Prior Publication Data
US 2020/0220925 A1     Jul. 9, 2020

Related U.S. Application Data

(60) Provisional application No. 62/958,215, filed on Jan. 7, 2020, provisional application No. 62/789,424, filed on Jan. 7, 2019.

(51) Int. Cl.
| | |
|---|---|
| *H04L 67/562* | (2022.01) |
| *H04L 67/1042* | (2022.01) |
| *H04L 67/1074* | (2022.01) |
| *H04L 67/104* | (2022.01) |
| *H04L 67/60* | (2022.01) |
| *H04L 67/53* | (2022.01) |
| *H04L 47/70* | (2022.01) |

(52) U.S. Cl.
CPC ...... *H04L 67/1078* (2013.01); *H04L 67/1044* (2013.01); *H04L 67/1059* (2013.01); *H04L 47/827* (2013.01); *H04L 67/20* (2013.01); *H04L 67/2809* (2013.01); *H04L 67/32* (2013.01)

(58) Field of Classification Search
CPC ..... G06F 9/5072; G06F 9/5066; H04L 41/50; H04L 41/5051; H04L 41/0806; H04L 47/827; H04L 67/12; H04L 67/20; H04L 67/2809
See application file for complete search history.

(56) References Cited

U.S. PATENT DOCUMENTS

| | | | |
|---|---|---|---|
| 2005/0021349 A1* | 1/2005 | Cheliotis | G06Q 10/06315 705/7.25 |
| 2009/0007125 A1* | 1/2009 | Barsness | G06F 9/5077 718/104 |
| 2016/0065417 A1* | 3/2016 | Sapuram | G06Q 30/0631 709/223 |
| 2019/0320006 A1* | 10/2019 | Allen | G06Q 20/00 |

* cited by examiner

*Primary Examiner* — Tom Y Chang
(74) *Attorney, Agent, or Firm* — Kilpatrick Townsend & Stockton LLP

(57) ABSTRACT

A method of correlating probability assertions and resource allocations includes receiving a first probability assertion and a first resource allocation from a first client device; receiving a second probability assertion and a second resource allocation from a second client device; correlating the first probability assertion with the second probability assertion by matching characteristics of the first probability assertion with characteristics of the second probability assertion; and creating a peer-to-peer match between the first request on the second request from the client devices.

20 Claims, 13 Drawing Sheets

PEER-TO-PEER CONNECTIONS BASED ON USER-DEFINED PROBABILITY ASSERTIONS

CROSS REFERENCES TO RELATED APPLICATIONS

This application claims the benefit of U.S. Provisional Application No. 62/789,424, titled "PEER-TO-PEER CORRELATION OF USER-DEFINED PROBABILITY ASSERTIONS," filed on Jan. 7, 2019, which is incorporated herein by reference. This application also claims the benefit of U.S. Provisional Application No. 62/958,215, titled "PEER-TO-PEER CONNECTIONS BASED ON USER-DEFINED PROBABILITY ASSERTIONS," filed on Jan. 7, 2020, which is incorporated herein by reference.

BACKGROUND

Peer-to-peer connections made through networked computers may perform a variety of different tasks or functions. Traditionally, peers may make a portion of their resources, such as processing power, network bandwidth, and/or storage resources available to other computers through a network. This allows peers to be suppliers of computer resources to other peers on the network, sharing computer resources with a subset of remaining peers on the network. For example, some peer-to-peer networks allow multiple peers to share portions of a file with another peer requesting that file to minimize the upload bandwidth used from each source peer. In other configurations, multiple peers may also be considered consumers of computer resources. For example, some systems allow a peer to farm out processing jobs or storage needs to other peers on the network. Creating connections between peers involves matching requested computing resources with available computing resources in these traditional configurations.

These traditional uses of peer-to-peer networking or computing are currently being augmented by emerging technologies to include other technical areas outside of traditional resource sharing. Specifically, peer-to-peer networking principles can be used to connect client devices to perform virtually any type of function in almost any area that uses online networking. However, existing algorithms and architectures cannot simply be ported from traditional peer-to-peer networks to handle many of the emerging needs for connecting peers in an optimal configuration. Therefore, a technical need exists in the field of peer-to-peer networking for analyzing a set of peer requests and generating optional matches between requests from a number of client devices.

BRIEF SUMMARY

In some embodiments, a method of matching resource allocation requests in a peer-to-peer networked system may include providing indications of a plurality of processes, where each of the plurality of processes may be associated with two or more conditional results. The method may also include receiving, from a first client device, a first request to allocate first resources, where the first request may identify a process in the plurality of processes for which the first resources are to be allocated, and the first request may include a user-defined probability assertion relating to a first conditional result in the two or more conditional results for the process. The method may additionally include generating an inverse probability assertion in response to receiving the first request, where the inverse probability assertion may be generated based on the user-defined probability assertion of the first request. The method may further include assigning the inverse probability assertion to a second conditional result in the two or more conditional results for the process, where the second conditional result may be an opposite of the first conditional result. The method may also include providing the inverse probability assertion through a public interface to other client devices. The method may additionally include receiving, from a second client device, a second request to allocate second resources, where the second request may identify the process in the plurality of processes for which the second resources are to be allocated, and the second request may select the inverse probability assertion. The method may further include creating a peer-to-peer match between the first request and the second request.

In some embodiments, a non-transitory computer-readable medium may include instructions that, when executed by one or more processors, may cause the one or more processors to perform operations including providing indications of a plurality of processes, where each of the plurality of processes may be associated with two or more conditional results. The operations may also include receiving, from a first client device, a first request to allocate first resources, where the first request may identify a process in the plurality of processes for which the first resources are to be allocated, and the first request may include a user-defined probability assertion relating to a first conditional result in the two or more conditional results for the process. The operations may additionally include generating an inverse probability assertion in response to receiving the first request, where the inverse probability assertion may be generated based on the user-defined probability assertion of the first request. The operations may further include assigning the inverse probability assertion to a second conditional result in the two or more conditional results for the process, where the second conditional result may be an opposite of the first conditional result. The operations may also include providing the inverse probability assertion through a public interface to other client devices. The operations may additionally include receiving, from a second client device, a second request to allocate second resources, where the second request may identify the process in the plurality of processes for which the second resources are to be allocated, and the second request may select the inverse probability assertion. The operations may further include creating a peer-to-peer match between the first request and the second request.

In some embodiments, a system may include one or more processors and one or more memory devices that may include instructions that, when executed by the one or more processors, may cause the one or more processors to perform operations including providing indications of a plurality of processes, where each of the plurality of processes may be associated with two or more conditional results. The operations may also include receiving, from a first client device, a first request to allocate first resources, where the first request may identify a process in the plurality of processes for which the first resources are to be allocated, and the first request may include a user-defined probability assertion relating to a first conditional result in the two or more conditional results for the process. The operations may additionally include generating an inverse probability assertion in response to receiving the first request, where the inverse probability assertion may be generated based on the user-defined probability assertion of the first request. The operations may further include assigning the inverse probability assertion to a second conditional result in the two or more conditional results for the process, where the second conditional result may be an opposite of the first conditional result. The operations may also include providing the inverse probability assertion through a public interface to other client devices. The operations may additionally include receiving, from a second client device, a second request to allocate second resources, where the second request may identify the process in the plurality of processes for which the second resources are to be allocated, and the second request may select the inverse probability assertion. The operations may further include creating a peer-to-peer match between the first request and the second request.

In any embodiments, any of the following features may be included in any combination and without limitation. The method/operations may also include determining that an amount of the first resources is greater than an amount of the second resources; and generating a new probability assertion that is assigned to the process and includes a fixed amount of resources equal to a difference between the amount of the first resources and the amount of the second resources, such that the new probability assertion and the fixed amount are available for peer-to-peer matches with the other client devices. The method/operations may also include receiving, from a third client device, a third request to allocate third resources, where the third request may identify the process in the plurality of processes for which the third resources are to be allocated, and the third request may select the inverse probability assertion. The method/operations may additionally include determining that an amount of the third resources and an amount of the second resources is equal to an amount of the first resources; and adding the third request to the peer-to-peer match between the first request and the second request. The first request and the second request may also identify one or more additional processes in the plurality of processes for which the first resources and the second resources are to be allocated. The first conditional result may require each of the one or more additional processes and the process to complete successfully. The second conditional result may require at least one of the one or more additional processes or the process do not complete successfully. The process may include an external event that completed outside of a system that creates the peer-to-peer match between the first request and the second request. Generating the inverse probability assertion may include creating a negative of the user-defined probability assertion, and reducing the inverse probability assertion and the user-defined probability assertion such that at least a portion of the first resources or the second resources are allocated to a system that creates the peer-to-peer match between the first request and the second request.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments of a technology architecture that facilitates the connections and/or matches between requests from client devices in a peer-to-peer network based on user-defined probabilies for resource allocations within a large population of client devices. A user may submit a request that includes a probability assertion and a corresponding resource allocation to the system. A characterization or version of the probability assertion and/or the resource allocation allocation may then be made publicly available on the system for one or more peer-to-peer matches. The system can efficiently match a plurality of users together to balance both sides such that the resulting resource allocations are equal. Some embodiments may also match requests.

Note that the architecture and methods described herein can be used for any allocation of resources based on probability assertions. One having ordinary skill in the art will readily recognize that these principles can be applied to any resource allocation scenarios. For example, this technology can also be applied to allocated computer hardware/software resources based on conditional process executions and results. This technology may also be used in any systems where the outcomes of future processes are uncertain.

Figure 1A:
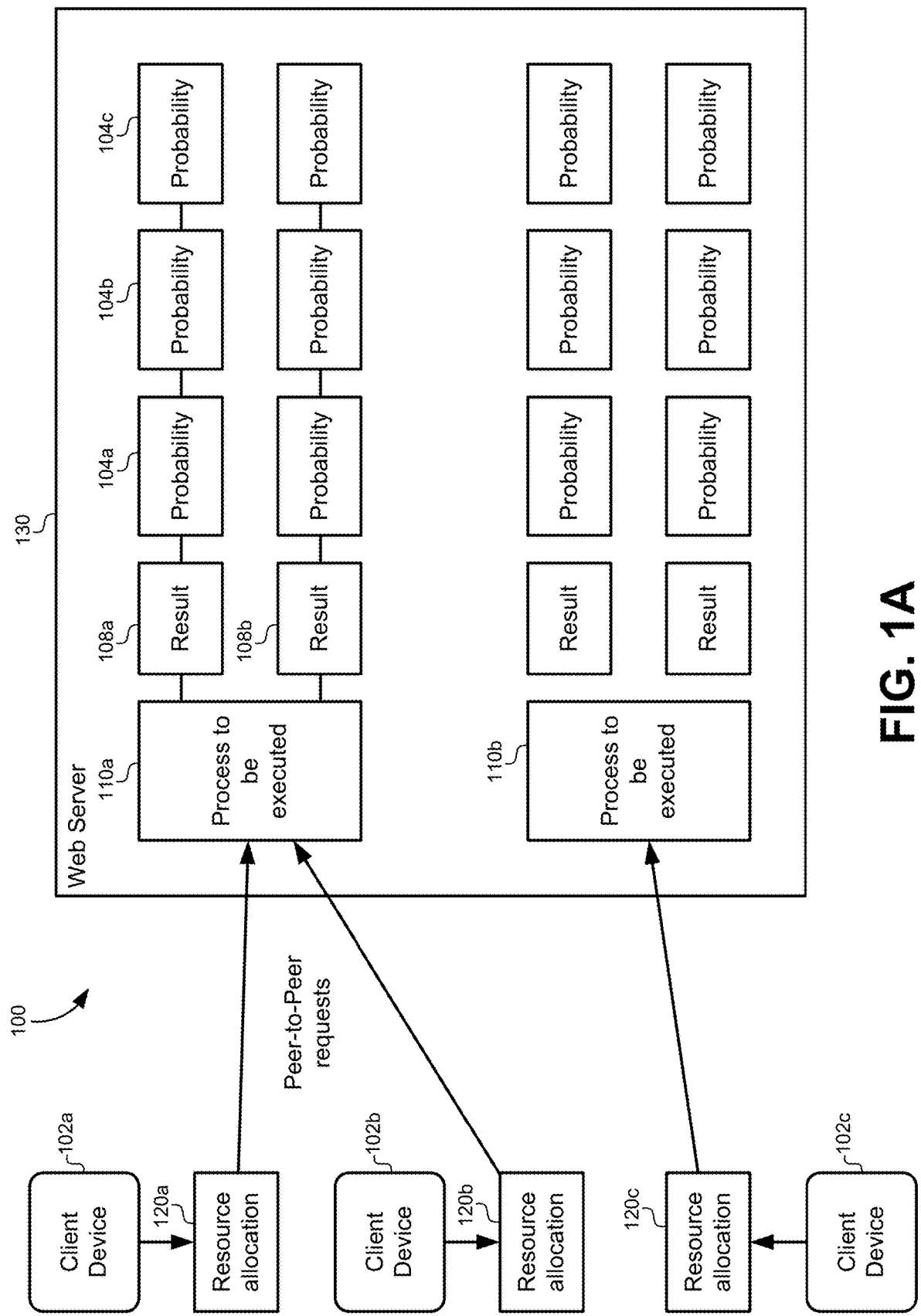
FIG. 1A illustrates an architecture of a system for submitting and matching resource allocation requests based on system-defined and user-defined probabilities, according to some embodiments.

FIG. 1A illustrates an architecture 100 of a system for submitting and matching resource allocation requests based on system-defined and user-defined probabilities, according to some embodiments. In this architecture, a peer-to-peer computing system is organized through a Web server 130. The Web server may organize the allocation of resources with associated probabilities for processes 110 that are to be executed. Requests for resource allocation may be received from client devices 102, and each request may include a specific amount of a resource available to be allocated towards a selected process out of all the processes to be executed that are listed at the Web server 130. The Web server 130 may then organize the various requests from client devices 102 in order to most efficiently allocate resources in a balanced manner for each of the processes 110.

In some embodiments, the Web server 130 may post a number of different processes 110 to be executed for which request may be submitted from client devices 102. Each of the processes may be an process that will be executed in the future but has not yet begun execution. Typically, once an process begins execution, no more requests may be submitted requesting resources to be allocated towards the process, although some embodiments may allow dynamic allocation of additional resources after the processes 110 has begun execution. The processes represent any task, event, or process that is that may be executed by the Web server 130 and/or by any external process or organization. In some embodiments, the processes may represent processing tasks to be executed by the Web server 130. In some embodiments, the processes 110 may represent processes external to the Web server 130 that may take place. The terms "process" and "event" may be used interchangeably in this disclosure. The Web server 130 may organize a list of processes 110 that are made publicly available such the client devices 102 may submit requests to allocate resources according to the various processes 110 that are available. The embodiment of FIG. 1A makes processes available through a Web server interface, and they may be made available on the client devices 102 through a web browser, application, mobile app, and/or other client representation of data sent from the Web server 130.

The Web server 130 may provide various results 108 that may be possible with the execution of each of the processes 110. Generally, at least two results 108 may be generated for each of the processes 110. In the simplest case, a first result 108a may characterize a "success" result, and a second result 108b may characterize a "fail" result. These may be described as opposing or opposite process results. In some embodiments, the results 108 may each characterize one of any number of possible outcomes of the processes 110 being executed. For example, the results 108 may each correspond to a numerical or other output by the processes 110 after they are executed. Generally, each type of process may be associated with their own descriptive outputs, the Web server 130 may generate results 108 that correspond to the most likely outputs generated by the processes 110 after execution.

For each of the results 108, the Web server 130 may also provide one or more probabilities 104 associated with each of the results 108. Because multiple results 108 may be generated by each of the processes 110 after execution, at least one probability may be assigned to each of the results 108 such that the Web server can balance resources allocated in relation to each of the results 108 for each of the processes 110. In some embodiments, if a particular one of the possible results 108 is more likely to be the outcome of the corresponding process, then it is possible that multiple client devices may submit requests to allocate resources for that particular result. By assigning probabilities 104 to each of the results 108, the Web server 130 may balance the peer-to-peer requests received for each of the results 108. Without this balancing effect, the Web server 130 may receive request to allocate resources that it cannot fulfill. In some embodiments, multiple probabilities 104 may be assigned for each result. For example, when results correspond to a binary output of success/fail, each of the probabilities 104 may characterize a different aspect of that particular result. A first probability 104a may represent the pure probability of one result occurring versus another result. A second probability 104b may represent an adjusted probability when the result is predicted beforehand to be more/less likely to occur than other results. A third probability 104c may represent combined outputs of multiple aspects of the process, and so forth.

For each of the processes 110, the Web server 130 may publish the process, along with each of the possible results 108 and the assigned probabilities 104 for each of the results 108. These processes may be published through an interface that is loaded on a client device using a web browser or other client application. In some embodiments, the Web server 130 may predict/generate the results 108 for each of the processes 110. The Web server 130 may also establish the probabilities 104 for each of the results 108 internally. In other embodiments, the Web server 130 may receive the results 108 and/or probabilities 104 from external sources made available through a web service or API.

In a peer-to-peer network, each of the client devices 102 may offer resources that may be allocated in relation to each of the processes 110. The client devices 102 may submit requests that include at least a resource allocation 120 to be allocated based on a specific one of the processes 110. In some embodiments, the request may also include one or more of the probabilities 104 and/or one of the specific results 108. For example, the request may include an amount of resources to be allocated 120a in relation to a process result 108a with a particular assigned probability 104b. Therefore, in some cases, the client device may not be allowed to allocate resources towards the processes 110 unless the request uses one of the results 108 and/or the probabilities 104 that are already generated and accepted by the Web server 130.

Allocating resources 120 may include providing any form of resource that may be allocated to one or more of the results 108. In some embodiments, the resource may include computing resources, such as processing power, memory storage, network bandwidth, and/or any other hardware/software resource that may be allocated. The resource may be allocated towards executing the processes 110 to be executed. For example, the resources allocated by the system may be used to execute the process. In other embodiments, the resource may be allocated external to the Web server 130 and/or may be shared directly between the client devices 102. Thus, the Web server 130 may organize requests in a peer-to-peer fashion such that processes may be executed external to the Web server 130 and/or resources may be allocated external to the Web server 130 such that the Web server 130 act as a central hub for coordinating the allocation of resources for specific process executions without executing the processes itself or handling resources. Instead, resources may be allocated directly between client devices 102 or may include other intermediary systems. Resource allocations 120 need not affect the outcome of the processes 110 to be executed, but the actual allocation of the resources may be dependent upon the results of the executed processes 110. Therefore, the processes 110 may act as conditional events that generate the results 108. The request for resource allocation 120 may then condition the resource allocation on specific process execution conditional outcomes.

Figure 1B:
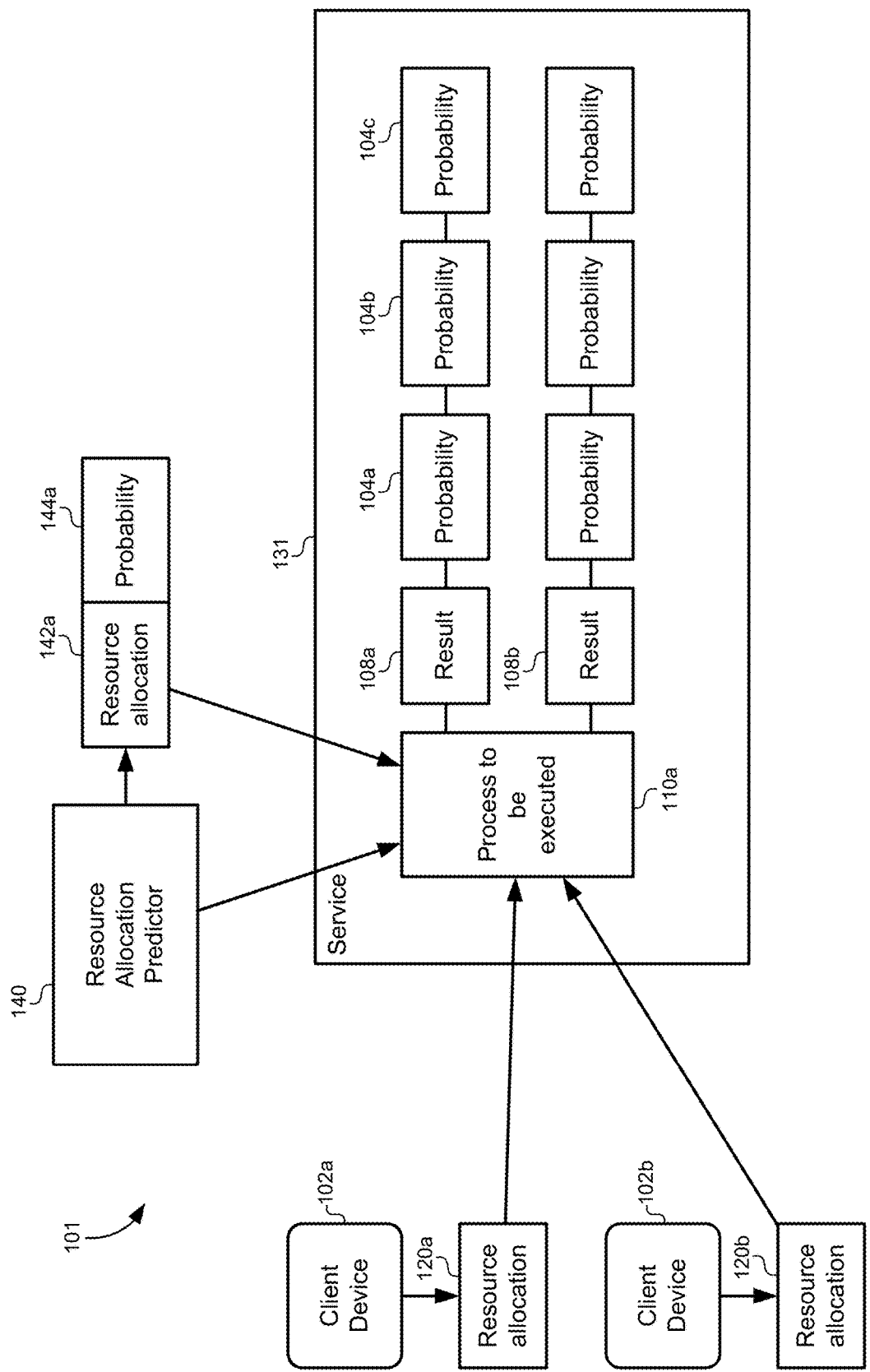
FIG. 1B illustrates an alternative architecture that uses an interface for matching peer-to-peer requests, according to some embodiments.

FIG. 1B illustrates an alternative architecture 101 that uses an interface for matching peer-to-peer requests, according to some embodiments. This architecture 101 is similar to the architecture 100 illustrated in FIG. 1A. However in this architecture 101, the matching engine that performs the peer-to-peer matching of resource allocation requests described above may be embedded in a public interface, such as an Application Programming Interface (API), a web service interface, a REST interface at a server, and/or any other public interface that may be available over a network. Each of the client devices 102 may submit requests for resource allocations 120 described above through the public interface. Additionally, the processes 110, along with their associated results 108 and probabilities 104 may be received from other sources through the public interface.

In this architecture 101, the service 131 may include functions that match the request for resource allocation 120 based on the associated probabilities 104. The architecture 101 may also dynamically adjust resource allocations 120 and/or probabilities 104 to balance resources allocated based on specific ways in which the processes 110 may be executed. In other cases, external systems may monitor the allocation of resources and dynamically adjust the probabilities 104 as resources are allocated to maintain a balance. In some embodiments, this may correspond to a load-balancing operation for various resources. Therefore, the service 131 can provide peer-to-peer matches between the various client devices 102 submitting requests to the service 131. Managing process executions, actual allocation of resources, and/or other tasks may be implemented by external systems. This allows the service 131 to simply manage the peer-to-peer matches without being required to manage other aspects of the processes or resources.

Figure 2A:
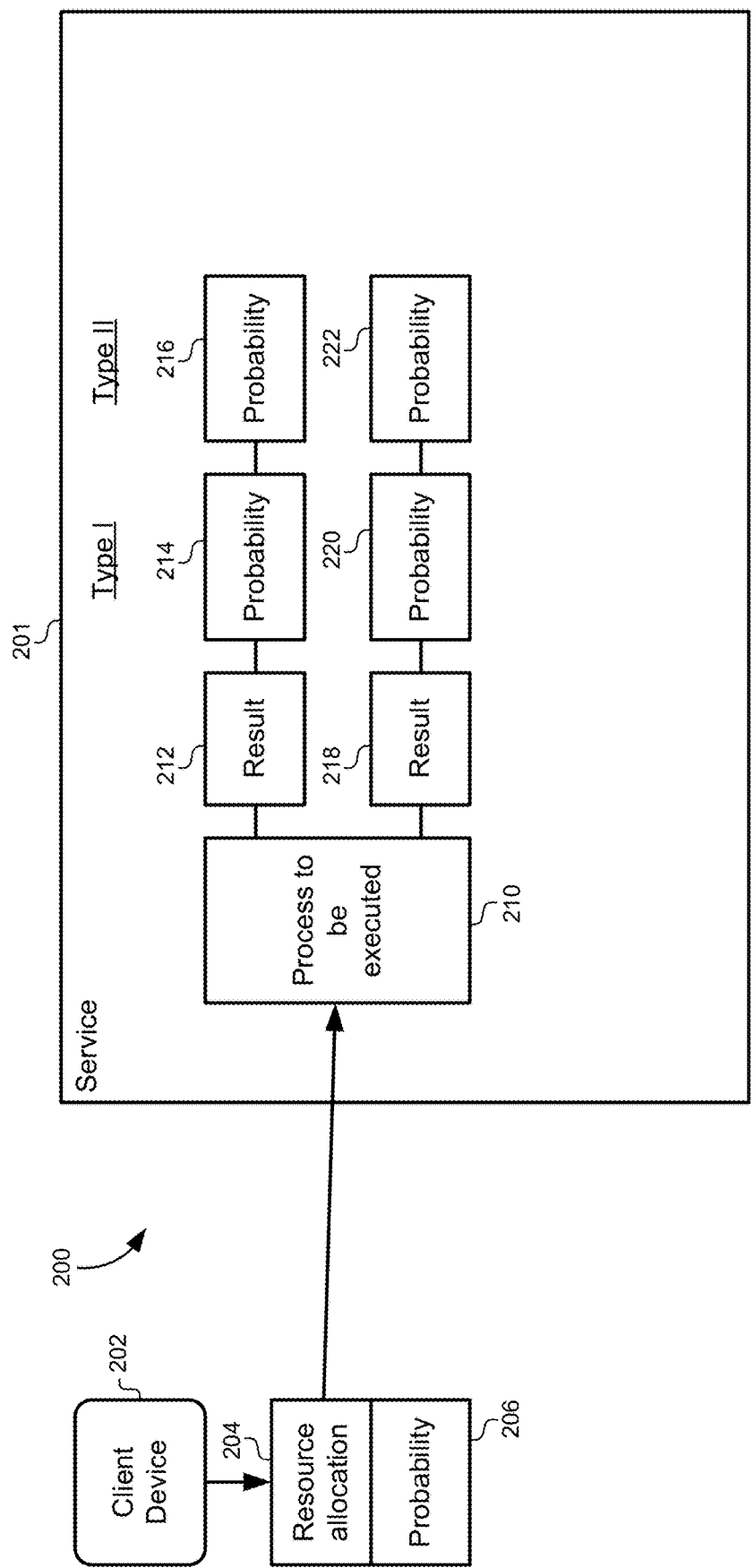
FIG. 2A illustrates an architecture where client devices may submit their own probability assertions for resource allocations, according to some embodiments.

FIG. 2A illustrates an architecture 200 where client devices may submit their own probability assertions for resource allocations, according to some embodiments. In the architectures described above, the system may generate predefined probabilities for each resource allocation. These predefined probabilities may be set prior to receiving a request from a client device. Therefore, the embodiments described above receive requests that allocate a specific resource to a predefined probability associated with corresponding process/result. This ensures that the system can maintain an optimal resource allocation balance.

The architecture 200 illustrated in FIG. 2A includes a system 201 allows users to submit a probability assertion 206 along with a resource allocation 204 as part of a request. Instead of being forced to choose a pre-existing probability 214, 216, 220, 222 for an available result 212, 214 for a predefined process to be executed 210, the system 201 may instead allow the client device 202 to submit a new probability assertion 206 for one of the existing results 212, 218. The probability assertion 206 may include any form of probability described above based on the conditional execution of the process to be executed 210 generating one of the available results 212, 218.

The request may include an amount of the resource to be allocated 204 along with the probability assertion 206. Additionally, the request may include a reference to the process to be scheduled 210. Recall that the system 201 may expose a number of processes to be executed to which resources may be allocated. Requests may generally reference a specific process out of all the processes that are available at the system 201.

The request may also include a specific probability type. As illustrated in FIG. 2, each of the results 212, 218 may be associated with a plurality of different probability assertions. For example, result 212 is associated with probability 214 and probability 216. Probability 214 and probability 220 may be of a first type, while probability 216 and probability 222 may be of a second type. Generally, the type for each probability may affect the way that resources are allocated when the process is executed. For example, a first type of probability may result in more resources being allocated for a given request than if a second type of probability was requested.

In previous architectures, the request would generally select one of the pre-existing probabilities already exposed through the interface of the system 201. In this architecture 200, the request may include a custom probability assertion 206 made by the client device 202. Because the type of probability and the numeric value(s) that may be associated with the probabilities govern the way in which the resource allocation 204 is made for the process execution, this allows users of the client device 202 more control over how their resources are allocated using the peer-to-peer connections.

Figure 2B:
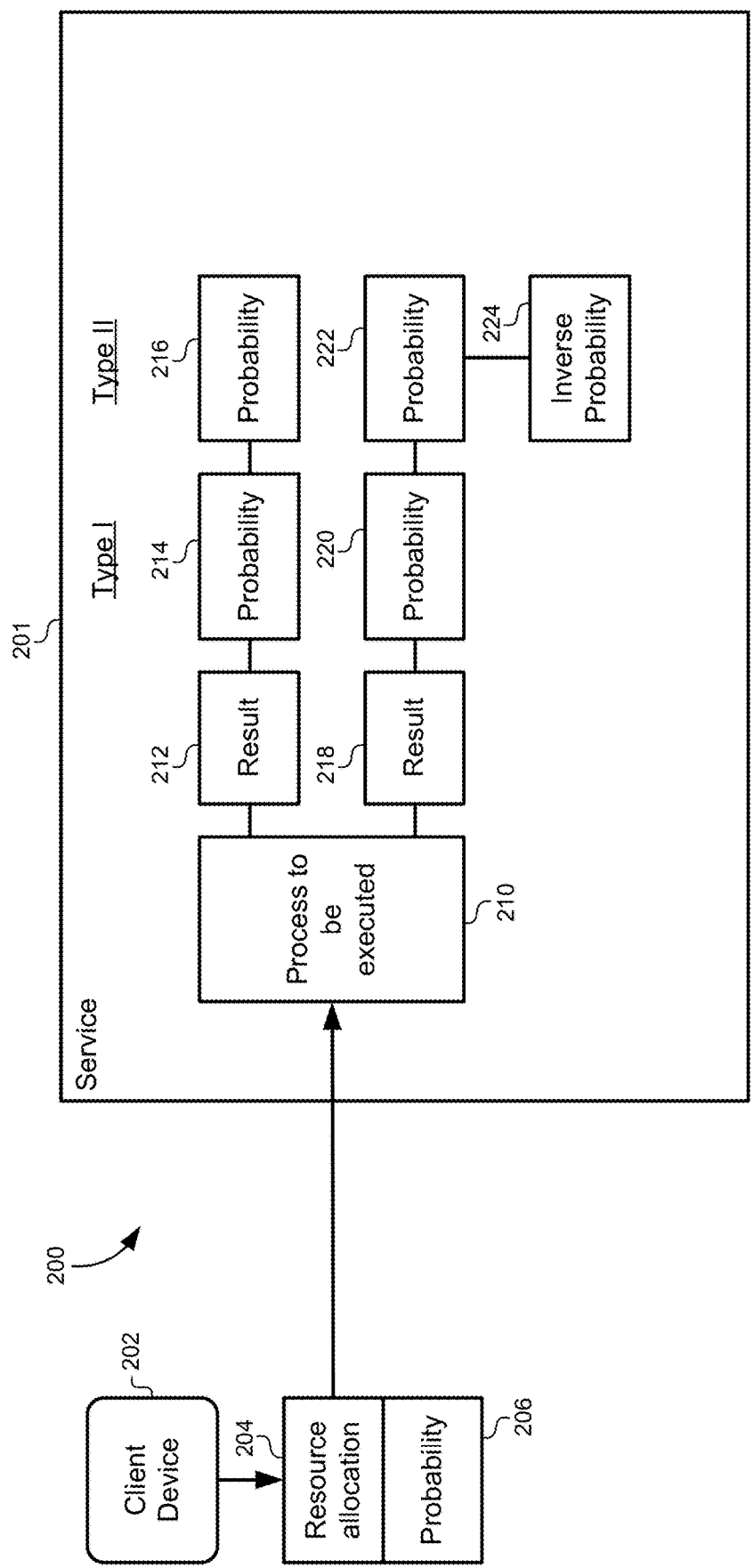
FIG. 2B illustrates how the architecture can balance the resource allocations when user-defined probability assertions are accepted, according to some embodiments.

FIG. 2B illustrates how the architecture 200 can balance the resource allocations when user-defined probability assertions are accepted, according to some embodiments. In the previous architectures, the system would balance the resources allocated for each of the conditional results by adjusting the probabilities. This ensured that adequate resources were being provided to the system such that it can meet any demands for resources that are made through the request in the peer-to-peer system. In existing architectures, custom, user-defined probability assertions are generally not allowed because they throw off the delicate balance assured by the predefined probabilities of the system. When the client device 202 selects a predefined probability (e.g., probability 214), this may in one sense be considered a selection of an inverse of that probability 214 such that it is offset in the system and this equilibrium of resource allocations may be maintained. Note that the embodiments described herein are flexible enough to deal with many situations. Thus, in any place where an inverse probability is used in this description, it may be replaced with the original user-defined probability assertion without limitation.

The system 201 may accept the user-defined probability assertion 206 by making an inverse probability assertion 224 available. The inverse probability assertion 224 may be generated such that it offsets resources allocated based on the opposing conditional result. For example, if the user-defined probability assertion 206 is submitted with a corresponding resource allocation 204 for conditional result 212, the system 201 may respond by generating an inverse probability 204 of the same type linked to the opposite conditional result 218 for the same process 210. Note that the request is associated with the probability type of probability 216, and thus the inverse probability 204 is of the same type (represented by the same vertical column).

Generating the inverse probability assertion 224 makes it available in the system such that it can be matched with other requests that originate from other client devices that accept the inverse probability assertion. In some embodiments, the inverse probability assertion 224 can simply be the mathematical negative of the original user-defined probability assertion 206. This provides for an equal allocation of resources for either conditional result 212, 218 of the executed process 210. Alternatively, some embodiments may adjust to the probability assertion 206 and/or the inverse probability assertion 224 such that a portion of the resources that would be provided/received through the peer-to-peer match would be allocated to the system 201. This may provide a small amount of the allocated resources to the service 201 such that it can continue to operate while extracting just a portion of the resources that are matched through the peer-to-peer network.

Figure 2C:
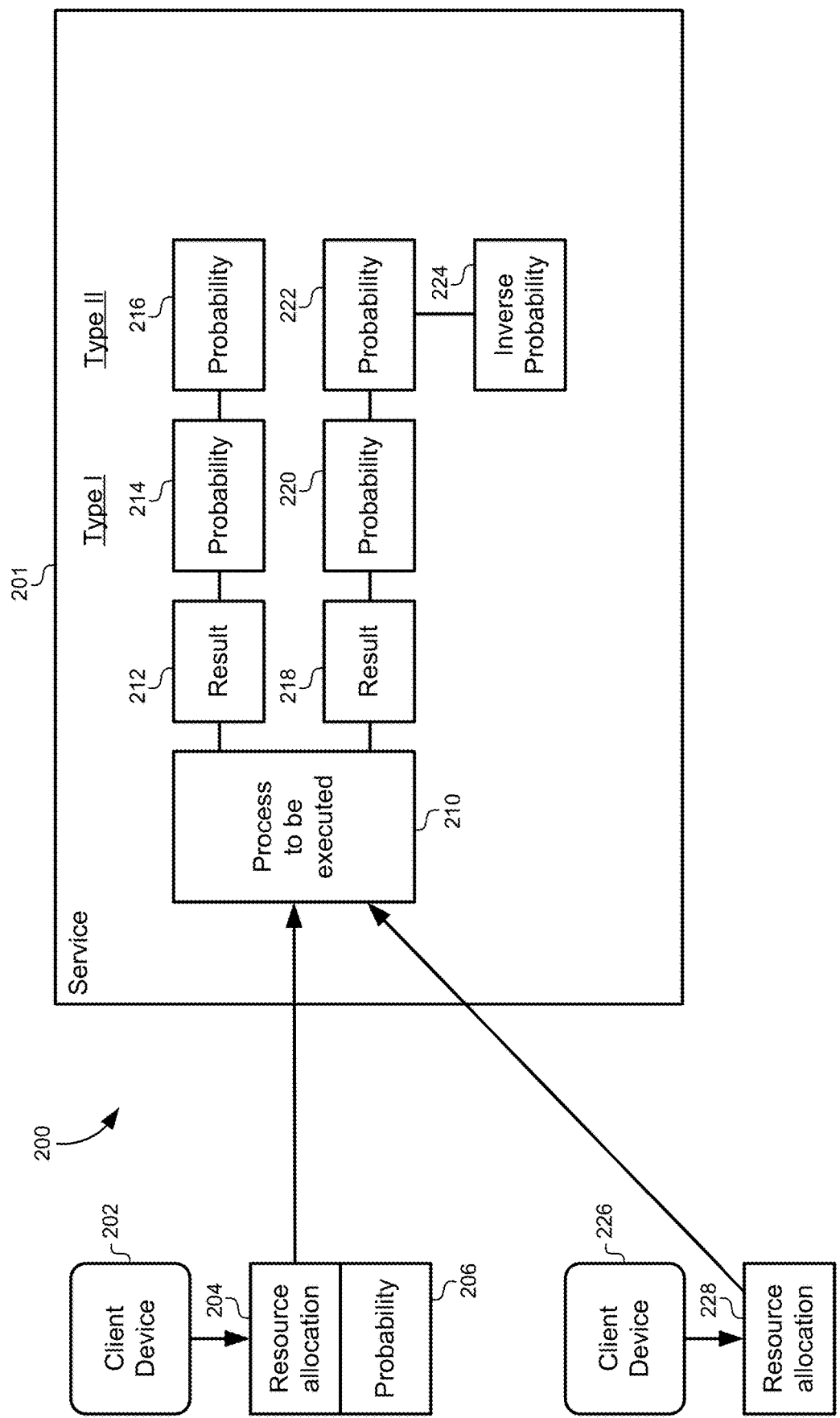
FIG. 2C illustrates how the architecture can match additional resource allocations to the inverse probability assertion to maintain a balance of resource allocations in the system, according to some embodiments.

FIG. 2C illustrates how the architecture 200 can match additional resource allocations to the inverse probability assertion 224 to maintain a balance of resource allocations in the system 201, according to some embodiments. After making the inverse probability assertion 224 available through the interface of the service 201, it may be available for selection by any other client devices in the peer-to-peer network. In some embodiments, the inverse probability assertion 224 may appear to be no different than the other probability assertions 220, 222 for the conditional result 218 of the process 210.

A second client device 226 may view the available probability selections that may be made for a resource allocation 228 for its own request. Instead of providing a user-defined probability assertion like client device 202, the second client device 226 may instead generate a request as described above in relation to FIGS. 1A-1B that includes a resource allocation 228. This request may reference the process 210, the conditional result 218, and the inverse probability assertion 224 already made available by the system 201. The system 201 can then create a peer-to-peer match between the client device 202 and the client device 226 such that their respective resource allocations 204, 228 offset each other and maintain the resource equilibrium maintained by the system 201. In some embodiments, the system 201 may remove the inverse probability assertion 224 from the public interface after the corresponding request is received from the client device 226.

Figure 3:
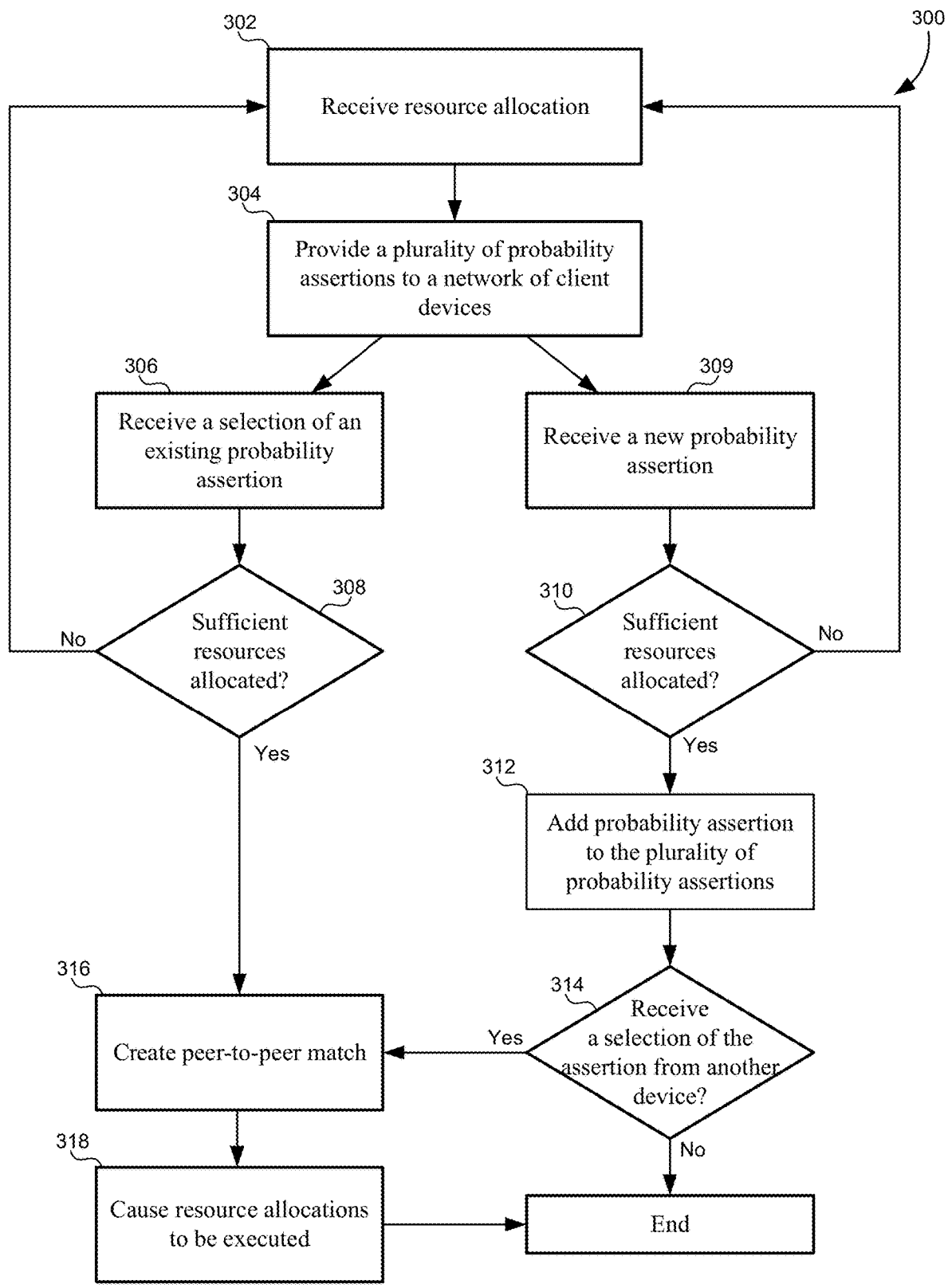
FIG. 3 illustrates a flowchart of a method for making peer-to-peer connections with user-defined probability assertions for allocating resources in a peer-to-peer network, according to some embodiments.

FIG. 3 illustrates a flowchart 300 of a method for making peer-to-peer connections with user-defined probability assertions for allocating resources in a peer-to-peer network, according to some embodiments. The method may include receiving a resource allocation in a resource store (302). Generally, the system may reserve resources that are allocated by a first client device such that they are available to the system. This prevents the client device from submitting a resource allocation request without first ensuring that those resources will be available to the system. This also ensures that the allocated resources are not reallocated by the client device somewhere else in the time between when the request is submitted and the process is evaluated. In one sense, this acts as a type of "semaphore" or hold on the resources submitted for allocation such that they are guaranteed to be available for completing the peer-to-peer match with another client device request.

The method may also include providing a plurality of probability assertions to a network of client devices (304). The system may provide indications of a plurality of processes, each of which may associated with two or more conditional results. For example, a list of available processes that are scheduled for execution may be provided, and opposing success/fail results and probabilities may be made available with each process listing. The network of client devices may be connected by any network, such as a WAN, a LAN, the World Wide Web, portions of the Internet, private networks, and/or any other network configuration. The plurality of probability assertions may include predefined probability assertions for predefined conditional results of process executions that may be defined by the system and/or received from external systems. Additionally, the probability assertions that are provided by the system may include user-defined probability assertions previously submitted to the system as described above. These user-defined probability assertions may be provided as inverse probability assertions as described above. The available probability assertions and/or results may be organized by the corresponding processes to be executed. The available probability assertions may be selected through a web interface, an API, a client application, a web browser or app, and/or through any other means of transmitting or displaying information or requests between the client devices and the system.

The method may further include receiving a selection of an existing probability assertion (306). The selection may be made by a client device from the set of existing probability assertions that are predefined and/or previously submitted to the system. For purposes of this example, it may be assumed that the client device selects a probability assertion that was created as an inverse probability assertion based on a previously received user-defined probability assertion from another client device. The system can then correlate or match these two opposing probability assertions and remove the selected probability assertion from the displayed or available list. Note that some embodiments may not require that the amount of allocated resources match exactly. Instead, these embodiments can correlate multiple requests from each side of the probability assertion to create an aggregate match of allocated resources. This correlation of multiple resource allocations is described in greater detail below. In some embodiments, this may be referred to as a "second request" to distinguish it from a "first request" that provided the probability assertion to the system in a prior request.

After correlating one or more probability assertions for the user selection, the method may further include determining whether sufficient resources are available for each of the client devices (308). In effect, the system may first determine whether resources have been made available by each client device before finalizing the peer-to-peer match. If sufficient resources are available such that the resource allocation may be completed, the method may include causing the resources to be allocated from both client devices (316). This may include creating a peer-to-peer match between the first request and the second request. This peer-to-peer match may be used to offset resources allocated by the first request with resources used in relation to the second request. This need not imply that an actual network connection is created between the first client device or the second line device, as connections may be made between third-party systems outside of this system. Note that verifying that sufficient resources are allocated is optional and not required by some embodiments. A hold or other form of reservation may be placed on the allocated resources from both client devices such that they can be allocated between the two client devices based on the execution of the process. This prevents client devices from over-committing the resources they made available to the system. Optionally, after the execution of the associated process, resources can be caused to be allocated to the respective users based on the result of the process (318), the amount of resources allocated with the probability assertion, and the probability assertion itself. Note that some embodiments may simply indicate that this allocation should take place, and external systems, such as the client devices themselves or a third party may be responsible for actually allocating the resources.

Instead of receiving a selection of an existing probability solution, client devices are also able to enter their own unique user-defined probability assertions into the system such that they are available for matching with other users. Therefore, the method may alternatively or additionally include receiving a new user-defined probability assertion from the client device (309). When the user-defined probability assertion is received, the system may determine whether sufficient resources are available from that client device (310).

If the resources are available for a future allocation as committed in the request, the method may additionally include adding this new probability assertion to the plurality of probability assertions provided to other users (312). As described above, the added probability assertion may be generated as an inverse of the user-defined probability assertion provided by the client device. This inverse may be added to the list of available probability assertions that are made available through the interface of the system. Generating the inverse probability assertion may also involve determining an opposite conditional result of the executed process and adding the inverse probability assertion to an opposing conditional result. The type of the received user-defined probability assertion may match the type to which the inverse probability assertion is added.

The method may also include receiving a selection of the inverse probability assertion from another client device (314). Receiving this selection may follow the process described above for steps 306 and 308. For example, the client device may select the inverse probability assertion from the available probability assertions. The system may correlate or match these two opposing probability assertions together to create a peer-to-peer match between the two client devices (316). As described above, when the associated process is executed, the system may cause resource allocations to be executed between the two client devices or external systems associated with the client devices (318).

It should be appreciated that the specific steps illustrated in FIG. 3 provide particular methods of handling user-defined probability assertions according to various embodiments. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

In addition to the single-process probability assertions described above, the embodiments described herein may also handle combined probability assertions for multiple processes. As described above, some processes may include a binary set of conditional results categorized as success/failure. Some embodiments may allow a client device to submit a request to allocate resources for results of more than one process. This allows for more control from requesting client systems as to how resources are allocated based on the conditional outcomes of some processes.

Figure 4:
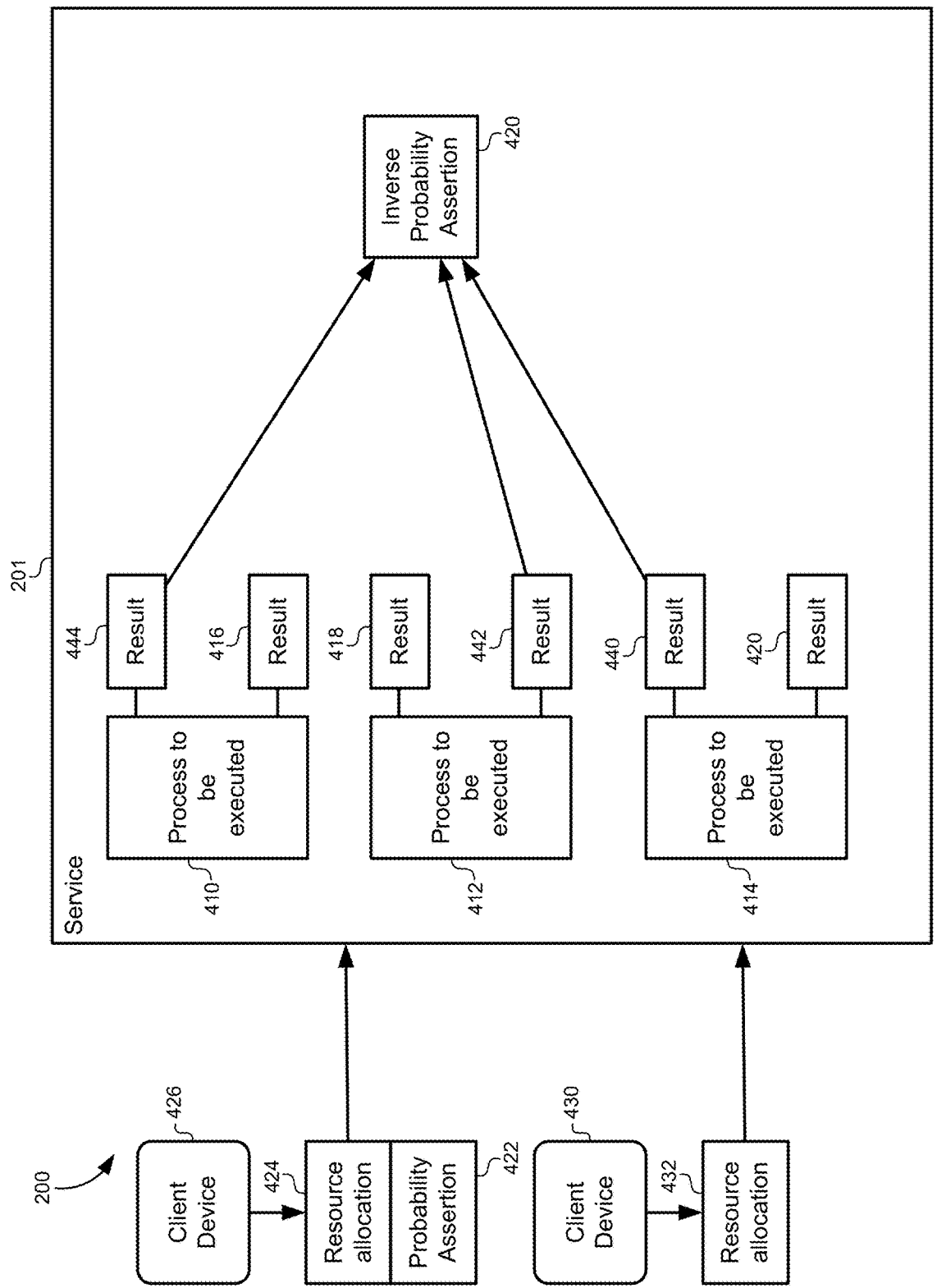
FIG. 4 illustrates how the architecture may accept a user-defined probability assertion, according to some embodiments.

FIG. 4 illustrates how the architecture 200 may accept a user-defined probability assertion, according to some embodiments. In this example, a first client device 426 may submit a resource allocation 424 and a user-defined probability assertion 422. Instead of allocating the resources 424 to a specific single process in the system 201, the request may specify that the resource allocation 424 be applied to a plurality of processes 410, 412, 414 made available through the interface of the system 201. If each of the processes 410, 412, 414 may be associated with conditional results that may or may not be mutually exclusive, the request may also include specific conditional results 416, 418, 420 for each of the specified processes 410, 412, 414. The system 201 may then generate an inverse probability assertion 420 as described above. The inverse probability assertion 420 may then be made available through the interface of the system 201 for requests from other client devices. Note that the inverse probability assertion 420 may be associated with the opposing conditional results 440, 442, 444 As were specified in the request.

Generally, the probability that the conditional results 416, 418, 420 will all be met may be relatively low compared to the individual probabilities for the individual conditional results as described above. Therefore, there are a number of ways that the system may balance the multi-result resource allocations. First, the system may receive a corresponding resource allocation request that selects the inverse probability assertion 420 generated by the request from the first client device 426. For example, a second client device 430 may submit a resource allocation 432 and select the inverse probability assertion 420. This may offset the resources allocated by the first client device 426 in a one-to-one, peer-to-peer match between the first client device 426 and the second client device 430. Note that because this second resource allocation 432 requires only one of the conditional results 440, 442, 444 to occur, the user-defined probability assertion 420 may involve a much lower probability. In other words, the first conditional result may require each of the processes to complete successfully; and the opposing second conditional result may require at least one of the processes process to not complete successfully.

Second, some embodiments may allow multiple resource allocations from multiple client devices to offset the single resource allocation made by the request from the first client device 426. Users may be able to select individual processes as part of an opposing allocation to the inverse probability 422. Combining multiple resource allocations across multiple processes may also occur on either side of the request. For example, multiple individual resource allocations may be combined for a higher probability assertion. Resource allocations for multiple processes submitted by a single client device may also be matched with multiple resource allocations from multiple devices based on the inverse probability assertion 420 that may be lower based on the probability that any of the conditional results 440, 442, 444 occurs.

The architecture described above produces inverse probability assertions based on one or more conditional outcomes to balance the opposing probabilities associated with conditional results. This ensures that each process result is balance as far as the probabilities are concerned. However, some embodiments may allow different resource allocation amounts to be associated with these opposing probability assertions as they are generated. For example, a first client device may submit a user-defined probability assertion with a relatively large amount of resources allocated, while a second client device may select the generated inverse probability assertion, yet only allocate a relatively small amount of resources. Even though the probabilities may be balanced for the different possible outcomes, the total resource allocations may still be imbalanced.

Figure 5:
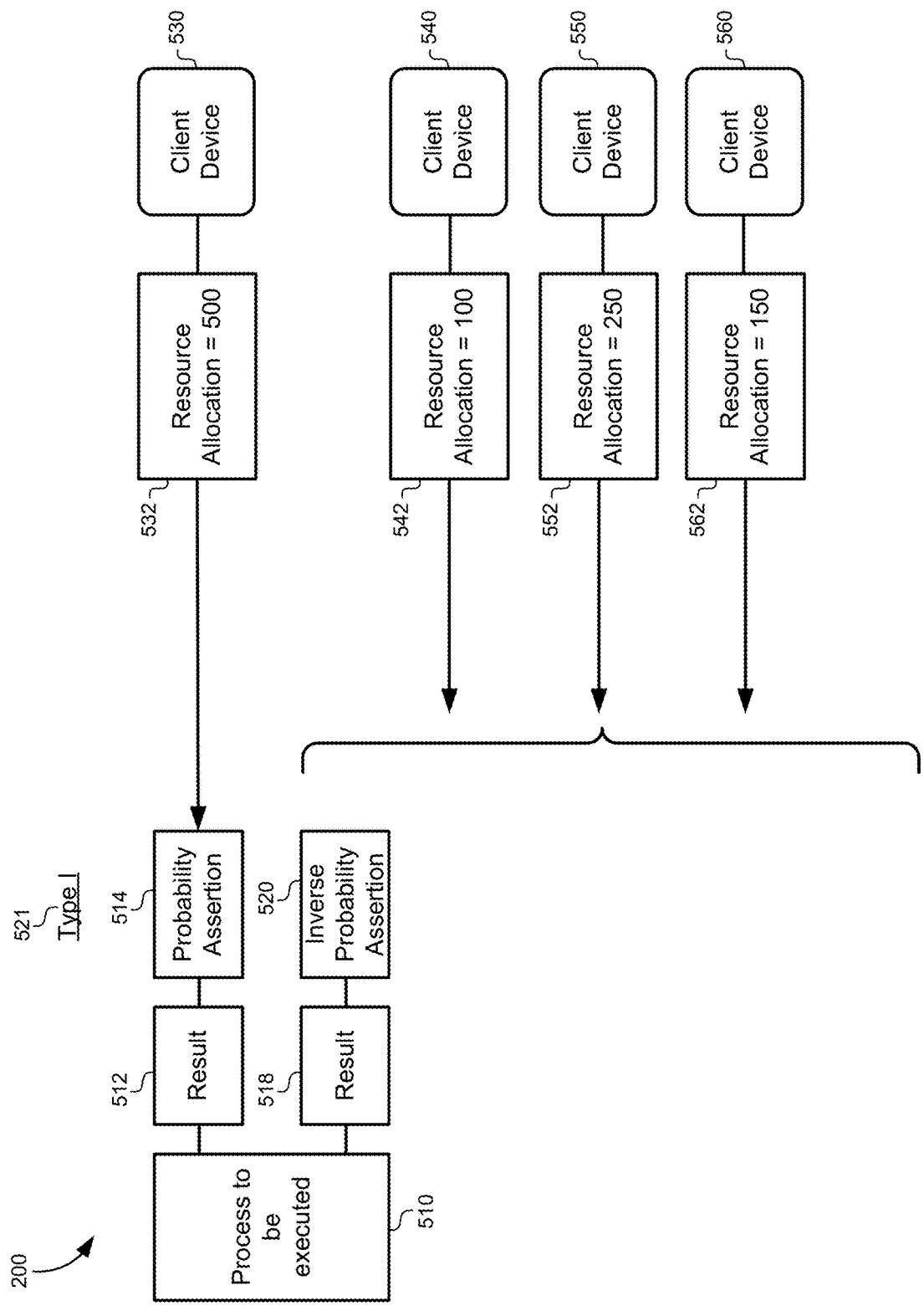
FIG. 5 illustrates how the architecture may balance resource allocations with user-defined operability assertions, according to some embodiments.

FIG. 5 illustrates how the architecture 200 may balance resource allocations with user-defined operability assertions, according to some embodiments. In this example, a first client device 530 may submit a resource allocation 532 with a user-defined probability assertion 514. As described above, the system may receive the user-defined probability assertion 514 for a specific process 510 and result 512 combination. A corresponding inverse probability assertion 520 may be generated and placed in the same type 521 for an opposing result 518 for the same process 510. This inverse probability assertion 520 may be made available for selection by other client devices.

By way of example, it may be assumed that the resource allocation amount for the resource allocation 532 is 500 units. These units are referenced generically, and may represent a measure of any type of resource. For example, this may represent processing power, memory storage, bandwidth, and/or any computing resource. These may also measure resources that are used and/or transferred outside of the system by third-party systems and/or the client devices themselves. Continuing with the example, a second client device 540 may select the inverse probability assertion 520 associated with result 518. However, the second client device 540 may submit a resource allocation 542 of only 100 units. Although the probability assertions 514, 520 may be matched, the total resources allocated for the different conditional process results are imbalanced, 500 to 100.

To balance the allocated resources, the system may allow more than one client device to select the inverse probability assertion 520 associated with the opposing conditional result 518. Continuing with this example, a third client device 550 may also select the inverse probability assertion 520 with a corresponding resource allocation 552 of 250 units. A fourth client device 560 may also select the inverse probability assertion 520 with a corresponding resource allocation 562 of 150 units. After this selection, the total amount of resources allocated under the inverse probability assertion 520 will equal 500 units, and the total resources allocated to the user-defined probability assertion 514 and the inverse probability assertion 520 may be balanced.

Figure 6:
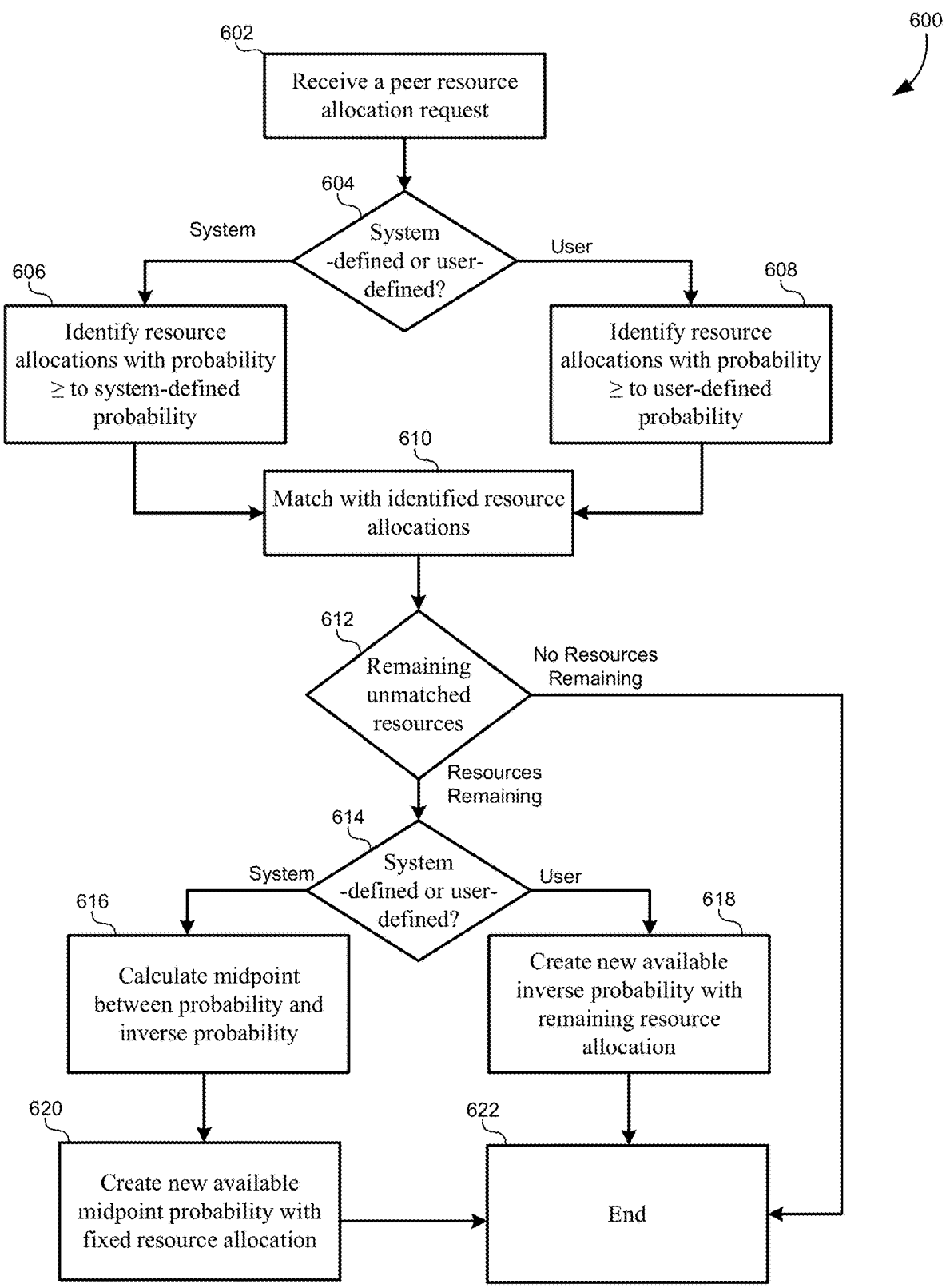
FIG. 6 illustrates a flowchart of a method for balancing resource allocations when user-defined probability assertions are accepted, according to some embodiments.

FIG. 6 illustrates a flowchart 600 of a method for balancing resource allocations when user-defined probability assertions are accepted, according to some embodiments. The method may include receiving a peer resource allocation request (602). This request may be received from a client device and may include a resource allocation amount as described above. This request may select a system-defined (e.g., fixed) probability or may submit a user-defined probability assertion that is not already represented in the system. As described above, this request may also be associated with a specific process and conditional result combination.

The method may also include determining whether the probability received with the request is system-defined or user-defined (604). If the probability assertion selected/received by the request is a user-defined probability assertion, then the method may include identifying resource allocations with probabilities that are greater than or equal to the user-defined probability assertion (608). This step may generate the inverse probability as described above for the user-defined probability assertion, then identify each available resource allocation request in the system for the same process but with the opposing conditional result. These available resource allocation requests may then be compared to the inverse probability assertion, and requests having a higher probability may be identified. This allows the system to match resource allocations with previous requests with higher probability assertions, which increases the likelihood that resources may be balanced. This same process may be carried out for a system-defined (e.g., fixed) probability selected by the request (606). However, the resource allocations may be compared to the system-defined probability rather than the user-defined probability assertion.

The method may also include matching one or more of the identified resource allocations with the resource allocation request (610). This matching operation may proceed sequentially through each of the identified resource allocations until one of two conditions is satisfied (612). First, matching may continue until the resource allocation in the original request is balanced. This may be indicated when the total amount of the identified resource allocations matches the resource allocation of the initial request. The total amount may be modified by the associated probability. In this case, the process may end, and the inverse probability assertion need not be posted in the system and made available to future requests, as it has been matched with previous requests such that the resource allocations are balanced on both sides.

Alternatively, the matching may continue until no identified resource allocations remain. This indicates that a surplus of resources may be left that have not yet been matched by the system for the original resource allocation request. In this case, the system may again determine whether the probability in the original request is system-defined or user-defined (614). If it is a user-defined probability assertion, then a new available inverse probability assertion may be created in the system with the remaining resource allocation balance that was not matched in the steps above. This new inverse probability may then be available to future resource allocation requests to be identified and matched in step 610 above.

For system-defined probabilities in the original request, the method may include calculating a midpoint between probabilities assigned to the opposing conditional results (616). For example, in a system with conditional results that can be characterized as success/fail, existing probabilities may be assigned to each conditional result. This step may calculate a midpoint probability between these two existing probabilities. The remaining resource allocation that was not matched in step 610 above may be assigned to the new midpoint probability, and the midpoint probability may be made available in the system to be matched with future resource allocation requests (620). In some cases, the remaining resource allocation may be a fixed amount associated with selecting this new inverse probability.

It should be appreciated that the specific steps illustrated in FIG. 6 provide particular methods of balancing resource allocations according to various embodiments. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
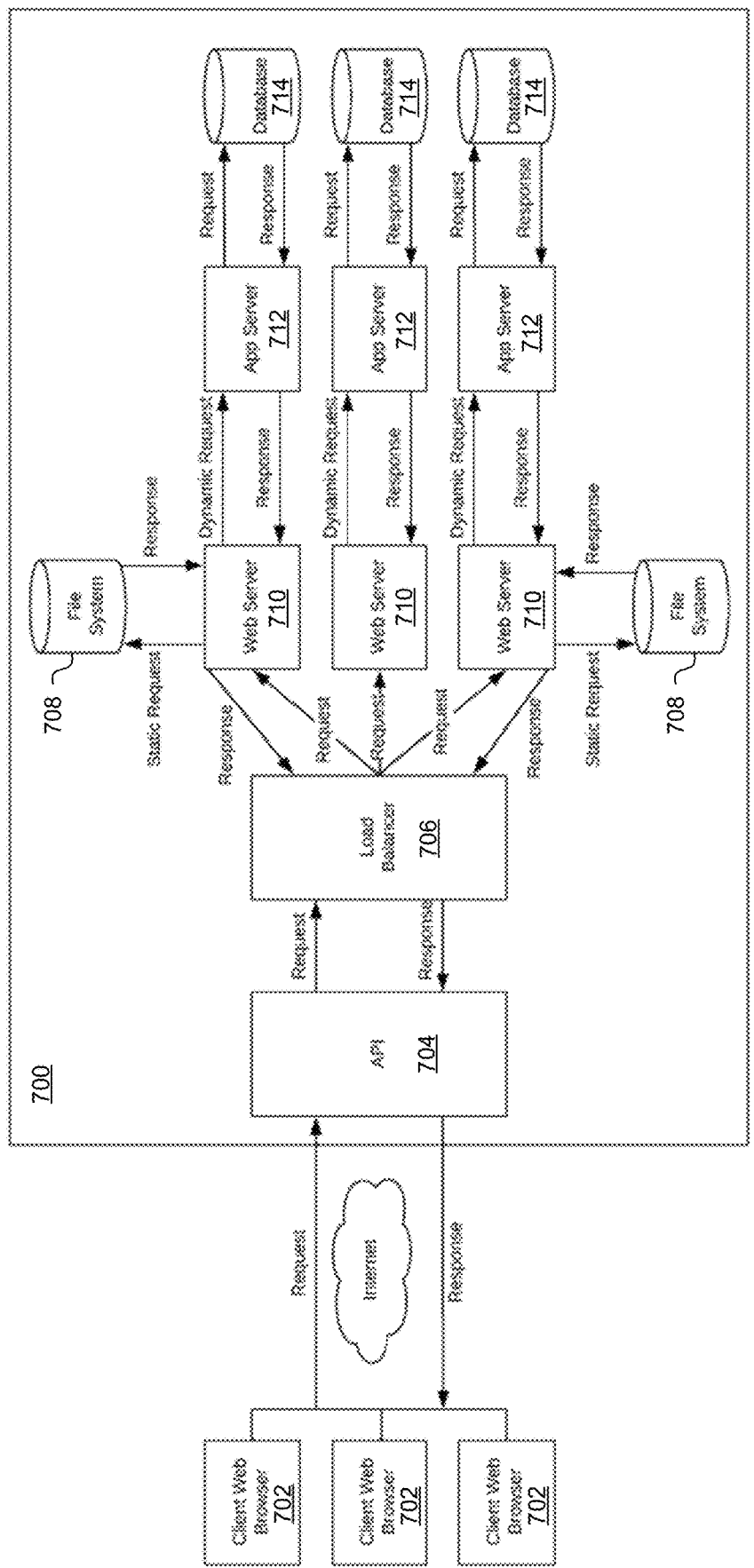
FIG. 7 illustrates a system architecture for a peer-to-peer system for providing and selecting probability assertions and resource allocations, according to some embodiments.

The description above comprises a top-level overview of how the system works from a user and system administrator perspective. The next section of this disclosure will describe in greater detail an underlying computer architecture and algorithms that enable this top-level process to be performed reliably and at a large scale. FIG. 7 illustrates a system architecture for a peer-to-peer system for providing and selecting probability assertions and resource allocations, according to some embodiments. The architecture of the proposed application may utilize a distributed system. User devices may communicate with the application through a user device's web browser 702. A user interface API 704 may receive incoming requests and send them to a load balancer 706. The load balancer 706 may distribute the requests to multiple web servers 710 to maintain an efficient workload across the application 700. Requests may be static or dynamic. Static requests may involve simple file retrieval, while dynamic requests may include the use of functions to return the desired result. The web servers 710 may receive requests and attempt to execute static requests by communicating with a file system 708 to return the requested file to the user. For example, a user visiting the website may trigger a request to the web server 710 for the site's HTML file. The web server 710 may check the file system 708, retrieve the file, and return it to the user. When the web server 710 receives a dynamic request, the request may be forwarded to an application server 712. The application server 712 may communicate with databases 714 that contain various pre-programmed functions and/or logic for completing user requests. For example, a request involving a resource allocation request may be forwarded to the application server 712, and may then use functions from the databases 714 that are executed within the application server 712 to fulfill the request.

Figure 8:
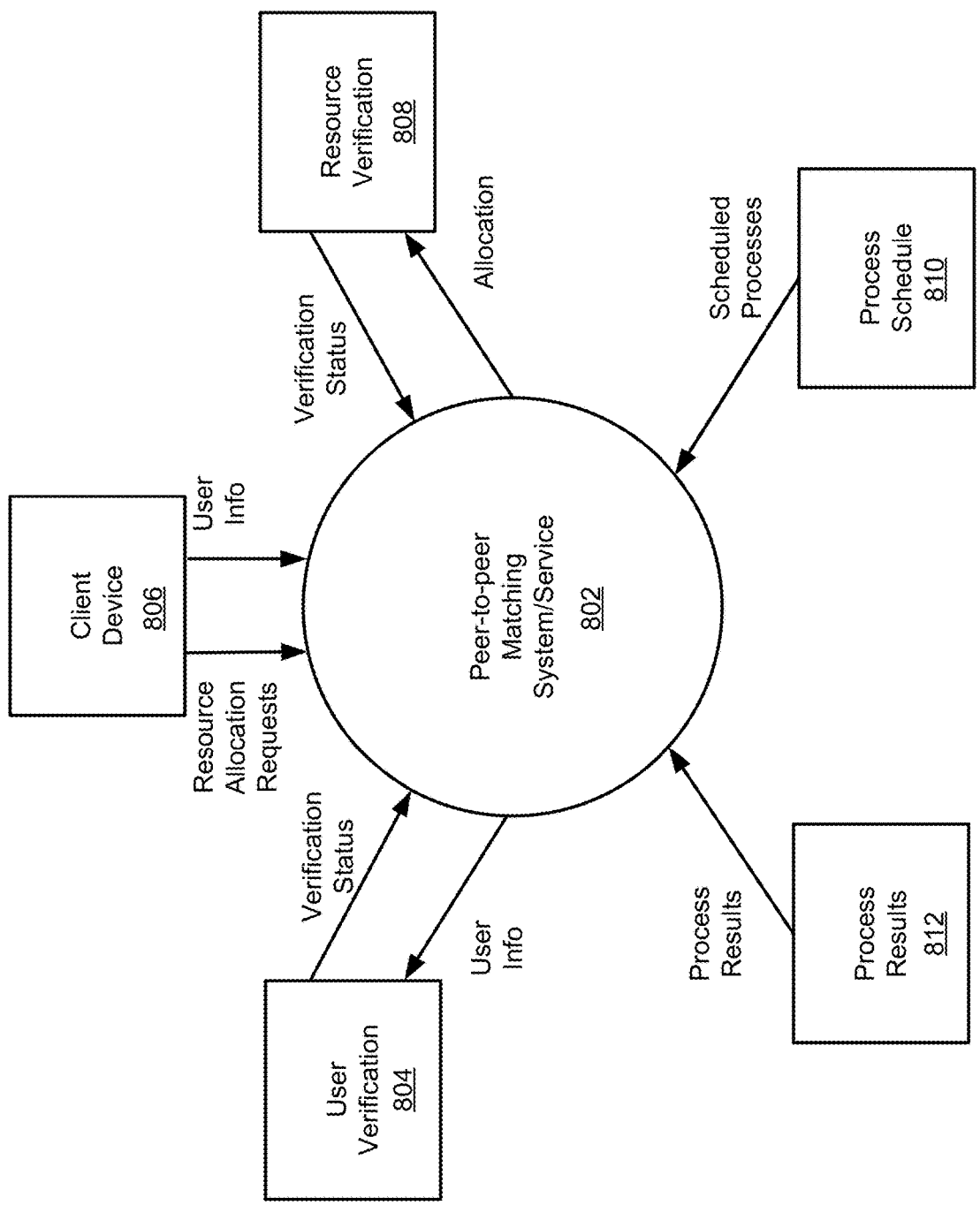
FIG. 8 illustrates how multiple external data sources can be used by some embodiments.

FIG. 8 illustrates how multiple external data sources can be used by some embodiments. In these embodiments, the system/service 802 may function as a matching engine that need not be required to actually allocate resources execute processes/events, track conditional results, and so forth. Instead, the system/service 802 may track processes, events, results, resource allocation requests, probability assertions, and any other data passing through the network to create peer-to-peer matches between various resource allocation requests received from client devices. When process results are received, the system/service 802 can trigger any of the external systems illustrated in FIG. 8 and cause them to allocate resources, and so forth.

For example, the resource allocation request and user information may be received from a client device 806. A user verification service 804 may be used to verify an identity of the user, and a resource verification service 808 may be used to reserve and/or verify the resources being allocated to the process. A process scheduler 810 may track and send scheduled processes that are upcoming for which resources may be allocated for incoming requests, and process results may be received from a service and/or monitoring system 812 that tracks processes as they are executed.

Figure 9:
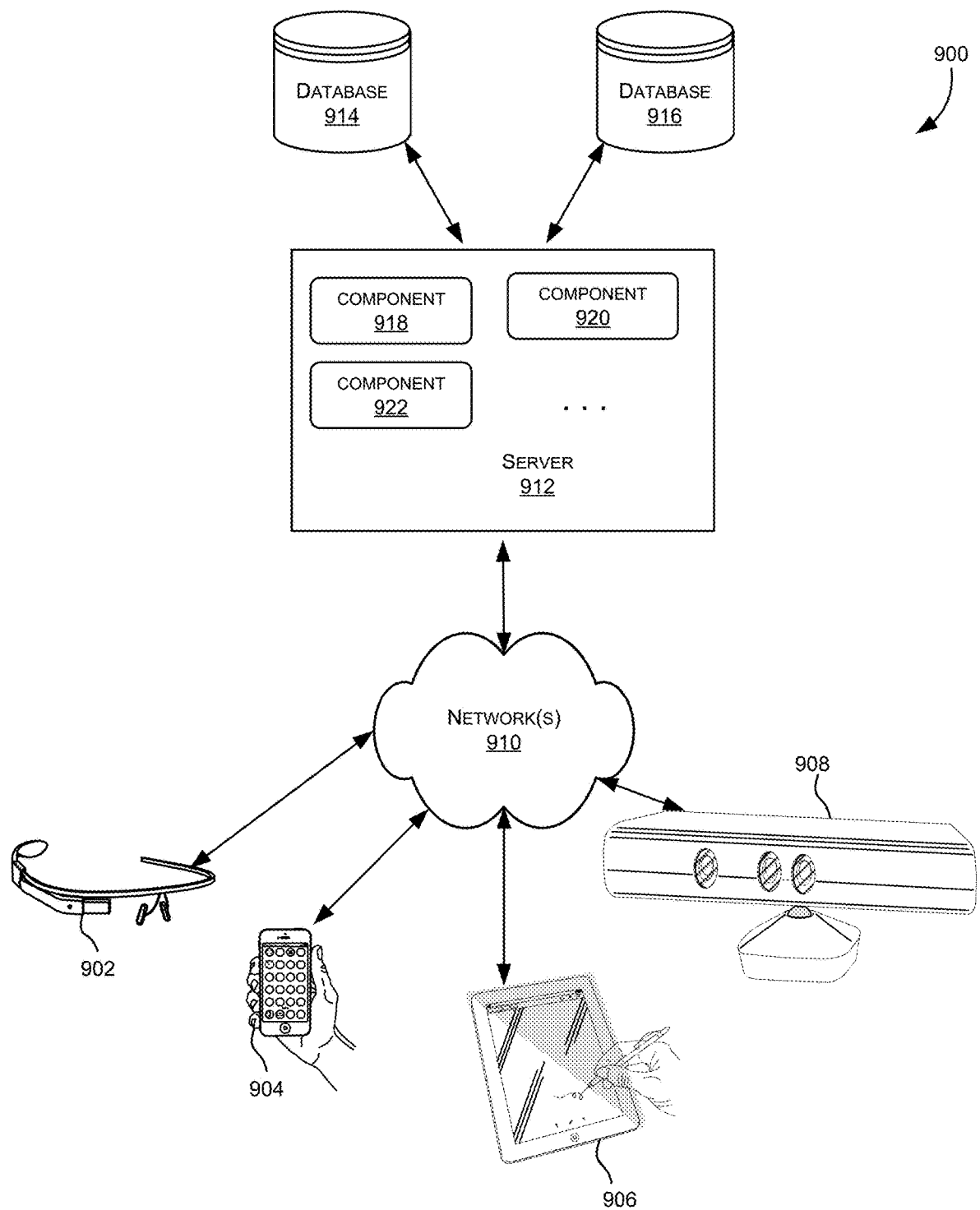
FIG. 9 illustrates a simplified block diagram of a distributed system for implementing some of the embodiments.

FIG. 9 depicts a simplified diagram of a distributed system 900 for implementing some of these embodiments. Distributed system 900 includes one or more client computing devices 902, 904, 906, and 908, which are configured to execute and operate a client application such as a web browser, proprietary client, or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or process updates received from users of client computing devices 902, 904, 906, and 908. As an example, data feeds and/or process updates may include, but are not limited to, Twitter® feeds, Facebook® updates or real-time updates received from one or more third party information sources and continuous data streams, which may include real-time processes related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time processes via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases that are adapted to store, update, and retrieve data in response to SQL-formatted commands.

Figure 10:
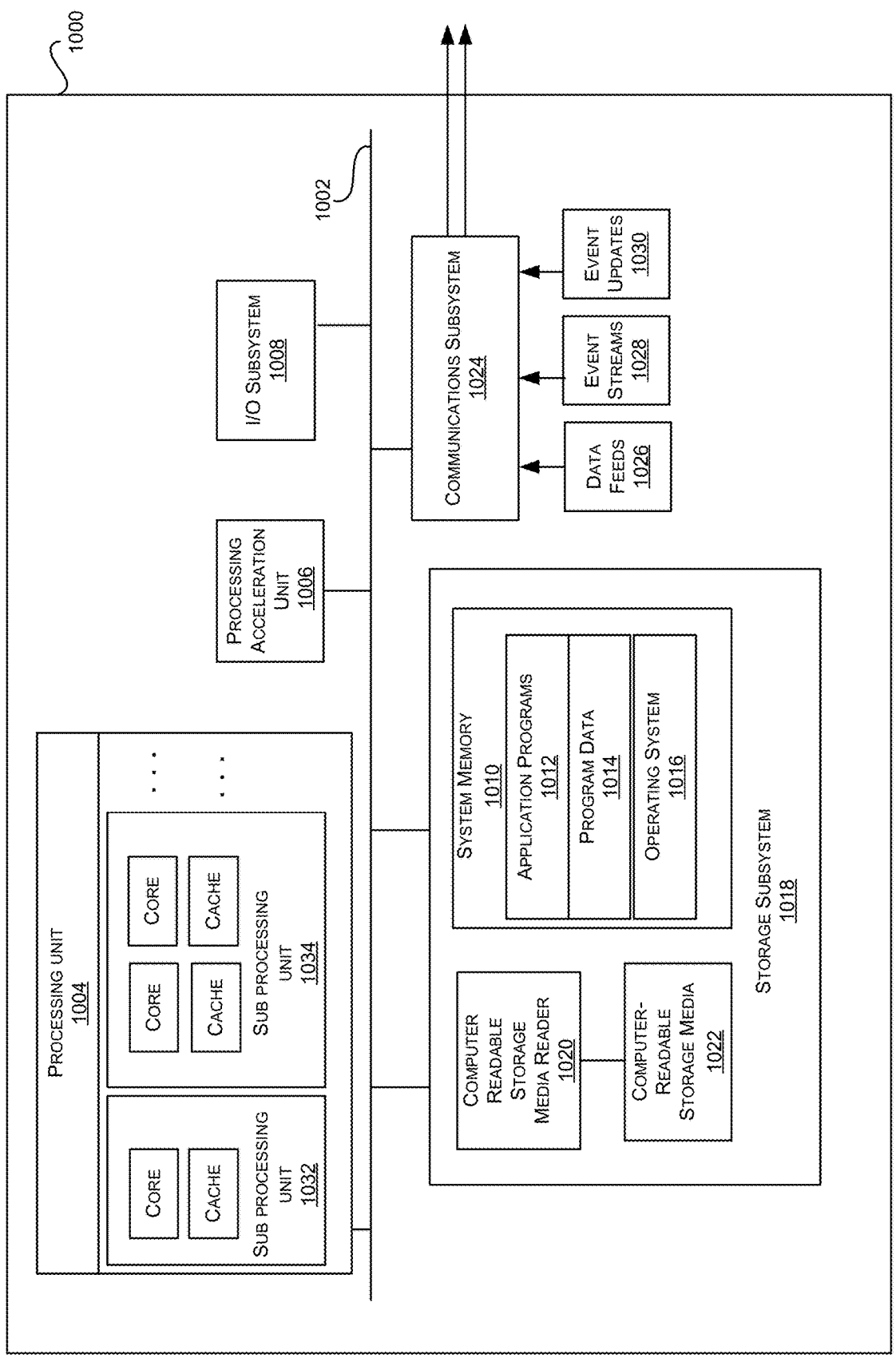
FIG. 10 illustrates an exemplary computer system, in which various embodiments may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, process streams 1028, process updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include process streams 1028 of real-time processes and/or process updates 1030, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1024 may also be configured to output the structured and/or unstructured data feeds 1026, process streams 1028, process updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:
1. A method of matching resource allocation requests in a peer-to-peer networked system, the method comprising:
   providing indications of a plurality of processes, wherein each of the plurality of processes is associated with two or more conditional results;

receiving, from a first client device, a first request to allocate first resources, wherein:
  the first request identifies a process in the plurality of processes for which the first resources are to be allocated;
  the first request comprises a user-defined probability assertion that is based on a first percentage probability that the first conditional result will occur for the process and the first resources will be available to be allocated; and
  the first conditional result defines a first end state of the process;
calculating an inverse probability assertion in response to receiving the first request, wherein:
  the inverse probability assertion is based on a second percentage probability that the second conditional result will occur for the process and the second resources will be available to be allocated; and
  the second percentage probability is calculated by subtracting the first percentage probability from a percentage greater than or equal to 100%;
assigning the inverse probability assertion to the second conditional result in the two or more conditional results for the process, wherein the second conditional result is an opposite of the first conditional result and defines a second end state of the process;
providing the inverse probability assertion through a public interface to other client devices;
receiving, from a second client device, a second request to allocate second resources, wherein:
  the second request identifies the process in the plurality of processes for which the second resources are to be allocated; and
  the second request selects the inverse probability assertion; and
creating a peer-to-peer match between the first request and the second request such that the first percentage added to the second percentage is at least 100%.

2. The method of claim 1, further comprising:
determining that an amount of the first resources is greater than an amount of the second resources; and
generating a new probability assertion that is assigned to the process and includes a fixed amount of resources equal to a difference between the amount of the first resources and the amount of the second resources, such that the new probability assertion and the fixed amount are available for peer-to-peer matches with the other client devices.

3. The method of claim 1, further comprising:
receiving, from a third client device, a third request to allocate third resources, wherein:
  the third request identifies the process in the plurality of processes for which the third resources are to be allocated; and
  the third request selects the inverse probability assertion; and
determining that an amount of the third resources and an amount of the second resources is equal to an amount of the first resources; and
adding the third request to the peer-to-peer match between the first request and the second request.

4. The method of claim 1, wherein the first request and the second request also identify one or more additional processes in the plurality of processes for which the first resources and the second resources are to be allocated.

5. The method of claim 4, wherein:
the first conditional result requires each of the one or more additional processes and the process to complete successfully; and
the second conditional result requires at least one of the one or more additional processes or the process do not complete successfully.

6. The method of claim 1, wherein the process comprises an external event that completed outside of a system that creates the peer-to-peer match between the first request and the second request.

7. The method of claim 1, wherein generating the inverse probability assertion comprises creating a negative of the user-defined probability assertion, and reducing the inverse probability assertion and the user-defined probability assertion such that at least a portion of the first resources or the second resources are allocated to a system that creates the peer-to-peer match between the first request and the second request.

8. A non-transitory computer-readable medium comprising instructions that, when executed by one or more processors, cause the one or more processors to perform operations comprising:
providing indications of a plurality of processes, wherein each of the plurality of processes is associated with two or more conditional results;
receiving, from a first client device, a first request to allocate first resources, wherein:
  the first request identifies a process in the plurality of processes for which the first resources are to be allocated;
  the first request comprises a user-defined probability assertion that is based on a first percentage probability that the first conditional result will occur for the process and the first resources will be available to be allocated; and
  the first conditional result defines a first end state of the process;
calculating an inverse probability assertion in response to receiving the first request, wherein:
  the inverse probability assertion is based on a second percentage probability that the second conditional result will occur for the process and the second resources will be available to be allocated; and
  the second percentage probability is calculated by subtracting the first percentage probability from a percentage greater than or equal to 100%;
assigning the inverse probability assertion to the second conditional result in the two or more conditional results for the process, wherein the second conditional result is an opposite of the first conditional result and defines a second end state of the process;
providing the inverse probability assertion through a public interface to other client devices;
receiving, from a second client device, a second request to allocate second resources, wherein:
  the second request identifies the process in the plurality of processes for which the second resources are to be allocated; and
  the second request selects the inverse probability assertion; and
creating a peer-to-peer match between the first request and the second request such that the first percentage added to the second percentage is at least 100%.

9. The non-transitory computer-readable medium of claim 8, wherein the operations further comprise:
- determining that an amount of the first resources is greater than an amount of the second resources; and
- generating a new probability assertion that is assigned to the process and includes a fixed amount of resources equal to a difference between the amount of the first resources and the amount of the second resources, such that the new probability assertion and the fixed amount are available for peer-to-peer matches with the other client devices.

10. The non-transitory computer-readable medium of claim 8, wherein the operations further comprise:
- receiving, from a third client device, a third request to allocate third resources, wherein:
  - the third request identifies the process in the plurality of processes for which the third resources are to be allocated; and
  - the third request selects the inverse probability assertion; and
- determining that an amount of the third resources and an amount of the second resources is equal to an amount of the first resources; and
- adding the third request to the peer-to-peer match between the first request and the second request.

11. The non-transitory computer-readable medium of claim 8, wherein the first request and the second request also identify one or more additional processes in the plurality of processes for which the first resources and the second resources are to be allocated.

12. The non-transitory computer-readable medium of claim 11, wherein:
- the first conditional result requires each of the one or more additional processes and the process to complete successfully; and
- the second conditional result requires at least one of the one or more additional processes or the process do not complete successfully.

13. The non-transitory computer-readable medium of claim 8, wherein the process comprises an external event that completed outside of a system that creates the peer-to-peer match between the first request and the second request.

14. The non-transitory computer-readable medium of claim 8, wherein generating the inverse probability assertion comprises creating a negative of the user-defined probability assertion, and reducing the inverse probability assertion and the user-defined probability assertion such that at least a portion of the first resources or the second resources are allocated to a system that creates the peer-to-peer match between the first request and the second request.

15. A system comprising:
- one or more processors; and
- one or more memory devices comprising instructions that, when executed by the one or more processors, cause the one or more processors to perform operations comprising:
  - providing indications of a plurality of processes, wherein each of the plurality of processes is associated with two or more conditional results;
  - receiving, from a first client device, a first request to allocate first resources, wherein:
    - the first request identifies a process in the plurality of processes for which the first resources are to be allocated;
    - the first request comprises a user-defined probability assertion that is based on a first percentage probability that the first conditional result will occur for the process and the first resources will be available to be allocated; and
    - the first conditional result defines a first end state of the process;
  - calculating an inverse probability assertion in response to receiving the first request, wherein:
    - the inverse probability assertion is based on a second percentage probability that the second conditional result will occur for the process and the second resources will be available to be allocated; and
    - the second percentage probability is calculated by subtracting the first percentage probability from a percentage greater than or equal to 100%;
  - assigning the inverse probability assertion to the second conditional result in the two or more conditional results for the process, wherein the second conditional result is an opposite of the first conditional result and defines a second end state of the process;
  - providing the inverse probability assertion through a public interface to other client devices;
  - receiving, from a second client device, a second request to allocate second resources, wherein:
    - the second request identifies the process in the plurality of processes for which the second resources are to be allocated; and
    - the second request selects the inverse probability assertion; and
  - creating a peer-to-peer match between the first request and the second request such that the first percentage added to the second percentage is at least 100%.

16. The system of claim 15, wherein the operations further comprise:
- determining that an amount of the first resources is greater than an amount of the second resources; and
- generating a new probability assertion that is assigned to the process and includes a fixed amount of resources equal to a difference between the amount of the first resources and the amount of the second resources, such that the new probability assertion and the fixed amount are available for peer-to-peer matches with the other client devices.

17. The system of claim 15, wherein the operations further comprise:
- receiving, from a third client device, a third request to allocate third resources, wherein:
  - the third request identifies the process in the plurality of processes for which the third resources are to be allocated; and
  - the third request selects the inverse probability assertion; and
- determining that an amount of the third resources and an amount of the second resources is equal to an amount of the first resources; and
- adding the third request to the peer-to-peer match between the first request and the second request.

18. The system of claim 15, wherein the first request and the second request also identify one or more additional processes in the plurality of processes for which the first resources and the second resources are to be allocated.

19. The system of claim 18, wherein:
- the first conditional result requires each of the one or more additional processes and the process to complete successfully; and the second conditional result requires at least one of the one or more additional processes or the process do not complete successfully.

20. The system of claim 15, wherein generating the inverse probability assertion comprises creating a negative of the user-defined probability assertion, and reducing the inverse probability assertion and the user-defined probability assertion such that at least a portion of the first resources or the second resources are allocated to a system that creates the peer-to-peer match between the first request and the second request.

* * * * *